United States Patent
Si et al.

(10) Patent No.: US 12,216,561 B2
(45) Date of Patent: Feb. 4, 2025

(54) APPLICATION LAUNCH DETECTION AND MANAGEMENT VIA LAUNCH INTERFACE CODE INSTRUMENTATION

(71) Applicant: Beijing Xiaomi Mobile Software Co., Ltd., Beijing (CN)

(72) Inventors: Mengyu Si, Beijing (CN); Jingcheng Zhang, Beijing (CN); Dong Li, Beijing (CN); Le Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 936 days.

(21) Appl. No.: 17/185,407

(22) Filed: Feb. 25, 2021

(65) Prior Publication Data

US 2021/0390026 A1    Dec. 16, 2021

(30) Foreign Application Priority Data

Jun. 12, 2020    (CN) .......................... 202010540157.9

(51) Int. Cl.
 *G06F 11/30* (2006.01)
 *G06F 9/48* (2006.01)
 *G06F 11/34* (2006.01)

(52) U.S. Cl.
 CPC .......... *G06F 11/3051* (2013.01); *G06F 9/485* (2013.01); *G06F 11/3438* (2013.01)

(58) Field of Classification Search
 CPC .............................. G06F 11/3051; G06F 9/485
 See application file for complete search history.

(56) References Cited

U.S. PATENT DOCUMENTS

| | | | | |
|---|---|---|---|---|
| 6,930,984 B1* | 8/2005 | Nomura | ................. | H04L 41/00 370/254 |
| 9,159,035 B1* | 10/2015 | Ismael | ................ | G06F 9/45558 |
| 10,452,440 B1* | 10/2019 | Odulinski | ............... | G06F 9/485 |
| 10,868,825 B1* | 12/2020 | Dominessy | ........... | H04L 43/045 |
| 2003/0192036 A1* | 10/2003 | Karkare | ............. | G06F 11/3466 717/148 |
| 2004/0068560 A1* | 4/2004 | Oulu | ................... | G06F 11/3495 709/224 |
| 2013/0007842 A1* | 1/2013 | Park | ........................ | H04W 4/60 726/3 |
| 2013/0055387 A1 | 2/2013 | Kim et al. | | |

(Continued)

FOREIGN PATENT DOCUMENTS

| CN | 104462952 A | 3/2015 |
|---|---|---|
| CN | 107122284 A | 9/2017 |
| CN | 107944259 A | 4/2018 |

OTHER PUBLICATIONS

Extended European Search Report in Application No. 21162241.0, issued Aug. 9, 2021.

(Continued)

*Primary Examiner* — Benjamin C Wu
(74) *Attorney, Agent, or Firm* — Finnegan, Henderson, Farabow, Garrett & Dunner, LLP (57) ABSTRACT

A method for processing information includes: detecting whether an application is launched; in response to detecting that the application is launched, determining a source for launching the application and detecting action information of the application; and displaying the source and the action information of the application.

10 Claims, 6 Drawing Sheets

(56) References Cited

U.S. PATENT DOCUMENTS

| | | | |
|---|---|---|---|
| 2013/0067473 A1* | 3/2013 | Olson | G06F 9/44505 |
| | | | 718/100 |
| 2015/0082286 A1* | 3/2015 | Gittelman | G06F 11/3664 |
| | | | 717/130 |
| 2016/0210018 A1* | 7/2016 | Singal | G06F 3/04886 |
| 2017/0257459 A1* | 9/2017 | Vaidyanathan | H04L 69/329 |
| 2018/0060579 A1* | 3/2018 | Stepan | G06F 21/54 |
| 2018/0060583 A1 | 3/2018 | Vainstein | |
| 2018/0121316 A1* | 5/2018 | Ismael | G06F 21/566 |
| 2018/0329508 A1* | 11/2018 | Klein | G06F 3/011 |
| 2019/0303178 A1* | 10/2019 | Mastracci | G06F 11/3636 |
| 2020/0110876 A1 | 4/2020 | Kwon et al. | |
| 2020/0127854 A1* | 4/2020 | Mandava | G06F 21/45 |
| 2022/0206561 A1* | 6/2022 | Chen | G06F 9/441 |

OTHER PUBLICATIONS

First Office Action issued for counterpart Chinese Application No. 202010540157.9, on Jun. 28, 2024.

* cited by examiner

APPLICATION LAUNCH DETECTION AND MANAGEMENT VIA LAUNCH INTERFACE CODE INSTRUMENTATION

CROSS REFERENCE TO RELATED APPLICATIONS

This application is based upon and claims priority to Chinese Application No. 202010540157.9, filed on Jun. 12, 2020, the entire content of which is incorporated herein by reference.

TECHNICAL FIELD

The present disclosure relates to a field of computer communication technologies, and more particularly to a method and device for processing information, and a storage medium.

BACKGROUND

With the development of terminal technologies, more and more applications are installed in a terminal, which enriches functions of the terminal and satisfies experience of a user.

Conventionally, there are malicious applications which may steal user data in the terminal and cause leakage of the user data. Therefore, how to find the malicious applications and prevent the malicious applications from stealing the user data is a technical problem that needs to be solved urgently.

SUMMARY

According to embodiments of the present disclosure, there is provided a method for processing information. The method is applied to a terminal, and includes: detecting whether an application is launched; in response to detecting that the application is launched, determining a source for launching the application and detecting action information of the application; and displaying the source and the action information of the application.

According to embodiments of the present disclosure, there is provided a terminal. The terminal includes a processor and a memory configured to store instructions executable by the processor. The processor is configured to: detect whether an application is launched; in response to detecting that the application is launched, determine a source for launching the application and detect action information of the application; and display the source and the action information of the application.

According to embodiments of the present disclosure, there is provided a non-transitory computer readable storage medium having stored thereon instructions that, when executed by a processor of a terminal, cause the terminal to perform a method for processing information. The method includes: detecting whether an application is launched; in response to detecting that the application is launched, determining a source for launching the application and detecting action information of the application; and displaying the source and the action information of the application.

It is to be understood that both the foregoing general description and the following detailed description are exemplary and explanatory only, and are not restrictive of the present disclosure.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with aspects of the present disclosure as detailed in the appended claims.

Terms used herein in the description of the present disclosure are merely for the purpose of describing exemplary embodiments, and should not be construed to limit the present disclosure. For example, the terms such as "first" and "second" may be used herein to describe various elements, these elements should not be limited by these terms. These terms are only used for distinguishing one element from another element. For example, first information may also be referred to as second information, and similarly, second information may also be referred to as first information, without departing from the scope of the present disclosure.

Figure 1:
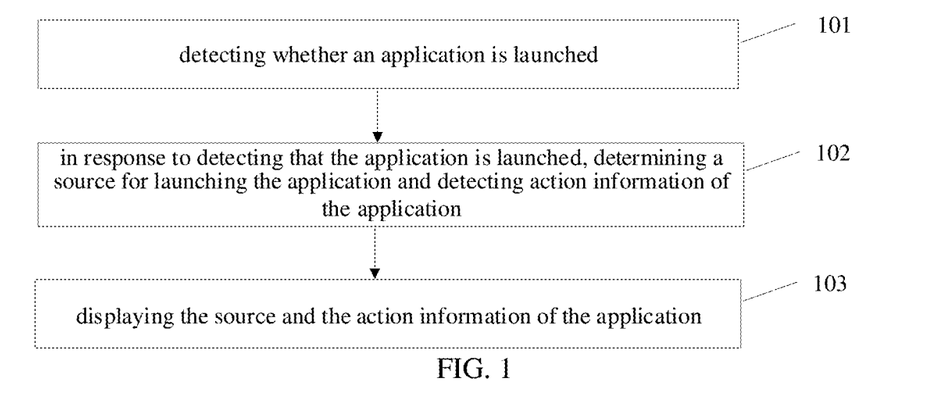
FIG. 1 is a flowchart illustrating a method for processing information according to an exemplary embodiment of the present disclosure.

FIG. 1 is a flowchart illustrating a method for processing information according to an exemplary embodiment of the present disclosure. The method may be applied to a terminal. As illustrated in FIG. 1, the method includes the following operations.

At block 101, it is detected whether an application is launched.

In the embodiment, the terminal is installed with applications. The terminal may detect whether an application is launched. The terminal may be a mobile phone, a tablet, a laptop, a wearable electronic device, etc.

In some embodiments, the application includes components. The terminal may detect whether a component of the application is launched. In response to determining that a component of the application is launched, the terminal may determine that the application is launched.

For example, an Android application includes an activity component (Activity), a broadcast component (Broadcast), a service component (Service), and a content provider component (ContentProvider). Once one of the above components is launched, it may be determined that the application is launched.

At block 102, in response to detecting that the application is launched, a source for launching the application is determined and action information of the application is detected.

In some embodiments, the source for launching applications includes: a chain-start source, an auto-start (also Autostart) source, and a user-start source. The chain-start source refers to a launching manner of calling the application by another application. The auto-start source refers to a launching manner based on system settings, such as based on broadcasts of the system or based on timing information of the system. The user-start source refers to a launching manner based on user operations performed such as on an icon on a desktop, on a notification bar on a desktop, or on a recent taskbar on the desktop.

In some embodiments, the terminal may determine the source for launching the application in the following manners.

In a first manner, the source is determined based on a launching interface of the launched component in response to determining that a component of the application is launched. The source includes: the chain-start source or the user-start source.

For the chain-start source and the user-start source, the component is launched through the launching interface of the component, and thus the application is launched. Through the launching interface of the launched component in the application, based on an entity for initiating the launching and an entity to be launched, it is determined whether the source is the chain-start source or the user-start source. For example, through the launching interface, it may be determined that the source for launching the application is a desktop source (or the user-source) in response to determining that the application is called by an application of the desktop. As another example, through the launching interface, it may be determined that the source for launching the application is the chain-start source in response to determining that the application is called by another application running in the background.

Based on the above, the terminal may obtain the source for launching the application from the launching interface of the launched component in the application.

Code instrumentation may be performed at the launching interface of each component. The source for launching the application may be recorded by means of code instrumentation technique to be obtained and used by the terminal.

In a second manner, the source is determined based on a system mechanism of the terminal. The source includes: an auto-start source.

The application may be associatively launched based on the system mechanism. That is, the application may be launched after the system mechanism is initiated. The applications may be managed to determine which of them may be activated by the system mechanism, by setting auto-start permissions. For example, the system mechanism may be a SyncManager system mechanism, a JobScheduler system mechanism, etc.

It may be determined by the terminal that the source for launching the application is the auto-start source in response to determining that the application is activated by the system mechanism. The action that the application is activated by the system mechanism may be recorded by means of the code instrumentation technique.

In some embodiments, the terminal may obtain, via a standard interface, an action that the application acquires user information, and record the action that the application acquires the user information by means of the code instrumentation technique.

The action that the application acquires the user information may be regarded as a dangerous action, which may cause a risk of leaking the user information. Therefore, the terminal records such actions.

In some embodiments, the action information of actions of the application includes at least one of: an object that is called, an occurrence time of an action, an occurrence number of the action, an execution result of the action, and an operation state of the application when the action of the application occurs. The execution result of the action includes allowing the action when the application is running in the foreground or restricting the action when the application is running in the background. The operation state includes a foreground running state or a background running state.

At block 103, the source and the action information of the application are displayed.

In the embodiment, the terminal displays the source and the action information of the application after obtaining the source and the action information of the application. In this way, the user, by viewing the information displayed by the terminal, may determine whether there is a malicious action in the running procedure of the application to manage the malicious action or the malicious application in time, thereby protecting the security of the user information in the terminal and ensuring the normal running of the terminal.

In some embodiments, the terminal may display the source and the action information of the application on a predetermined display interface in an order of time.

The user may know about the source, the action information, the launching time, the occurrence time of the action, and an occurrence sequence of various actions of the application, based on contents displayed on the display interface.

If the application initiates the action of obtaining the user information when running in the background, the terminal may restrict such action, thereby preventing the application running in the background from secretly obtaining the user information and causing leakage of the user information.

In order to highlight the action information of the application running in the background, the terminal may separately display the action information of the application running in the foreground and the action information of the application running in the background, which is convenient for the user to view different types of information.

In some embodiments, the predetermined display interface may be provided with at least one of: an access of setting permissions, an access of forcibly stopping applications, and an access of uninstalling applications. Permissions of the applications may be adjusted, for example, by a user using the access of setting permissions. Running applications may be forcibly stopped, for example, by a user using the access of forcibly stopping applications. Applications may be uninstalled from the terminal, for example, by a user using the access of uninstalling applications.

Figure 2:
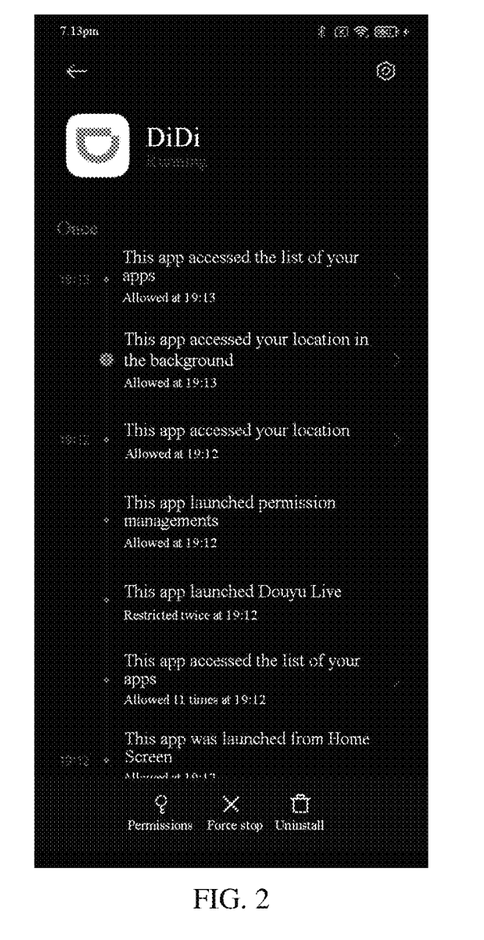
FIG. 2 is a schematic diagram illustrating a display interface according to an exemplary embodiment of the present disclosure.

FIG. 2 is a schematic diagram illustrating a display interface of an application according to an exemplary embodiment of the present disclosure. The source and the action information of the application are displayed on the display interface of the application illustrated in FIG. 2 in an order of time. The source is the launching manner based on user operations performed an icon on a desktop. The action information of each action includes: the content of the action, the occurrence time of the action, the occurrence number of the action and the execution result of the action. The occurrence number of the action refers to the occurrence number of the action within a certain period. Herein, the certain period within which the occurrence number of each action is recorded is the same. The certain period corresponding to each action may be, for example, the same minute. The action information may not include the occurrence number of the action, which indicates that the mentioned action occurs once within the certain period. The execution result of the action includes: allowing the action or restricting the action.

For example, as illustrated in FIG. 2, the action information of the action includes: "This app accessed the list of your apps" and "allowed 11 times at 19:12". By viewing the display interface, the user may obtain the above information that the application has accessed the list of applications for 11 times within a minute of 19:12.

As another example, also illustrated in FIG. 2, the action information of the action includes: "This app accessed your location in the background", and "allowed at 19:13". By viewing the display interface, the user may obtain the information that at 19:13, the application requested the location in the background, and this action is allowed by the terminal.

In some embodiments, the terminal differentially may display the action information of the application running in the foreground and the action information of the application running in the background.

In some embodiments, a permission may be set for each application by a user. For example, an action that the application obtains the user information when the application is running in the background is restricted by the terminal. In this case, the action information corresponding to the action that the application running in the background obtains the user information may include restricting the action.

For example, the action information illustrated in FIG. 2 may be modified from "This app accessed your location in the background" and "allowed at 19:13" to "This app accessed your location in the background" and "restricted at 19:13".

As illustrated in FIG. 2, the display interface of the application is provided with a key of "Permissions", a key of "Force stop," and a key of "Uninstall". The applications may be managed accordingly by the user with the keys. Accordingly, the terminal may receive an input command generated based on the action information of the application to manage the application.

In some embodiments, the terminal may display the sources and the action information of applications on the predetermined display interface, thereby implementing the summary and display of information of different applications.

For example, the sources and the action information of different applications are displayed on the predetermined display interface in an order of time.

The predetermined display interface is provided with an access of filtering actions. The access of filtering actions may include at least one of: an access related to all records, an access related to the Autostart, an access related to the chain start, an access of using permissions, and an access of sensitive actions. One or more target actions may be determined by the terminal based on information used by the access of filtering actions. The action information of the one or more target actions of the application may be recorded and displayed.

For example, when the access related to all records is triggered by the user, the terminal records various sources for launching the applications, actions of setting permissions and action information of sensitive actions. A sensitive action may refer to the action of obtaining the user information. When an access related to the chain start is triggered by the user, the terminal may only record the sources of the applications that are launched by the chain-start source. When the access related to the sensitive actions is triggered by the user, the terminal may only record the action information of the sensitive actions of the applications occurred.

In some embodiments, the terminal provides the access of filtering actions. The user may set types of the information recorded by the terminal with the access of filtering actions, which enriches the functions of the terminal and improves the experience of the user.

Figure 3:
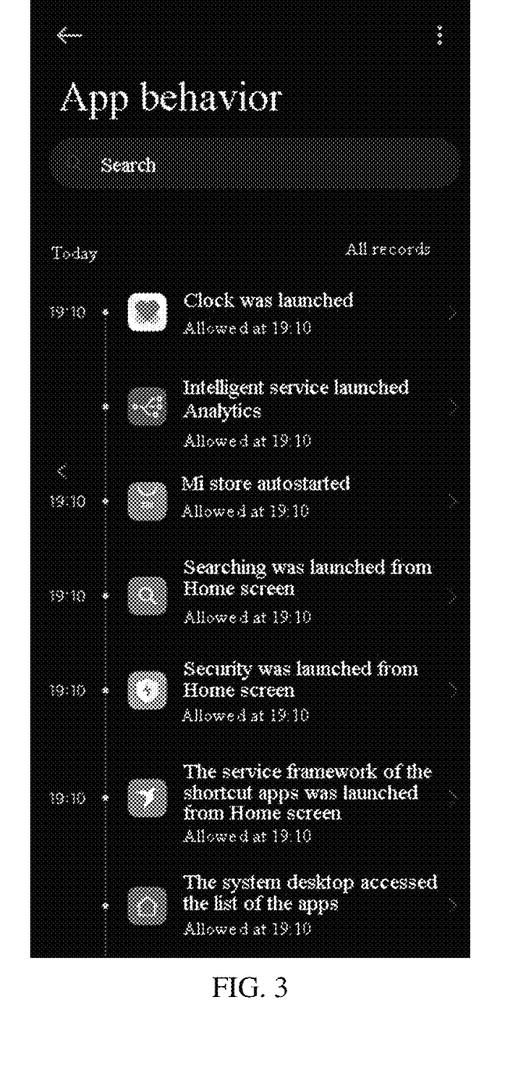
FIG. 3 is a schematic diagram illustrating a display interface according to an exemplary embodiment of the present disclosure.

FIG. 3 is a schematic diagram illustrating another display interface according to an exemplary embodiment of the present disclosure. The sources and the action information of different applications are displayed on the display interface illustrated in FIG. 3 in an order of time.

For example, as illustrated in FIG. 3, the action information may be "Mi store autostarted" and "Allowed at 19:10". The source may be the auto-start source. The execution result of the action may be allowing the action of autostarting the application store by the terminal. As another example, the action information may be "The system desktop accessed the list of apps" and "Allowed at 19:10".

Figure 4:
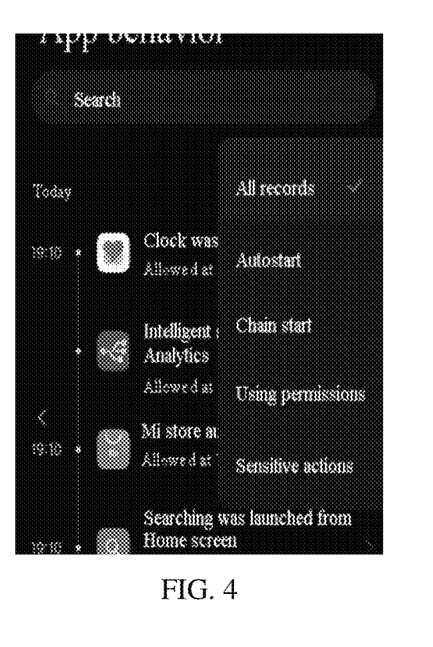
FIG. 4 is a schematic diagram illustrating a sub-interface of the display interface illustrated in FIG. 3, according to an exemplary embodiment of the present disclosure.

A functional key is provided on the right side of the display interface illustrated in FIG. 3. In response to triggering the functional key, a sub-interface pops up, as illustrated in FIG. 4. Five optional accesses are provided on the sub-interface. The user may select any one of the optional accesses based on a record requirement to control the terminal to record the required information.

As illustrated in FIG. 3, when the access related to all records is triggered and displayed on the display interface, the terminal records action information of all actions of applications. That is, the terminal records various sources of the applications, actions of setting the permissions and action information of the sensitive actions.

In embodiments of the present disclosure, the terminal detects whether the application is launched, the source for launching the application is determined in response to detecting that the application is launched, the action information of the application is detected, and the source and the action information of the application are displayed. The terminal may display the source and the action information of the application. The user may check the information displayed by the terminal to determine whether the application has the malicious action during running and manage the malicious action or malicious application in time, thereby protecting the security of the user information in the terminal and ensuring the normal running of the terminal.

The above method embodiments are described in a series of actions. Those skilled in the art will understand that the present disclosure is not limited by the described sequence of actions. Some steps may be performed in other sequences or at the same time based on the present disclosure.

Corresponding to the above method embodiments, the present disclosure also provides apparatus embodiments for implementing an application function and corresponding terminal embodiments.

Figure 5:
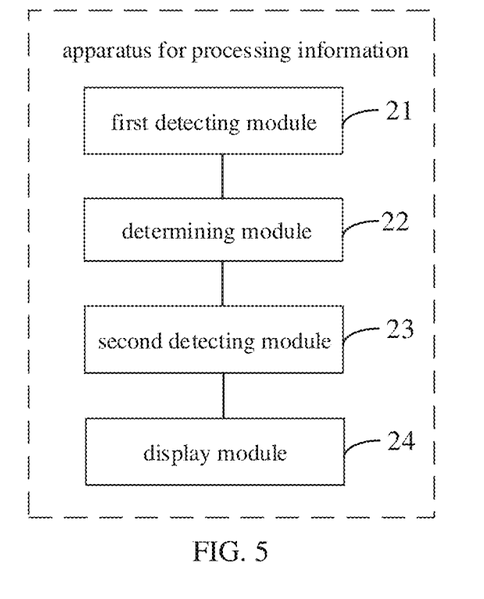
FIG. 5 is a block diagram illustrating an apparatus for processing information according to an exemplary embodiment of the present disclosure.

FIG. 5 is a block diagram illustrating an apparatus for processing information according to an exemplary embodiment of the present disclosure. The apparatus is applied to the terminal. The apparatus may include a first detecting module 21, a determining module 22, a second detecting module 23, and a display module 24.

The first detecting module 21 is configured to detect whether an application is launched. The determining module 22 is configured to determine a source for launching the application in response to detecting that the application is launched. The second detecting module 23 is configured to detect action information of the application. The display module 24 is configured to display the source and the action information of the application.

In an embodiment, on the basis of the apparatus for processing the information illustrated in FIG. 5, the first detecting module 21 may include a detecting sub-module and a determining sub-module. The detecting sub-module is configured to detect whether a component of the application is launched. The determining sub-module is configured to determine that the application is launched in response to detecting that the component of the application is launched.

In an embodiment, the determining module includes one of: a first determining sub-module and a second determining sub-module. The first determining sub-module is configured to determine the source based on a launching interface of the launched component. The source includes: a chain-start source or a user-start source. The second determining sub-module is configured to determine the source based on a system mechanism of the terminal. The source includes: an auto-start source.

In an embodiment, on the basis of the apparatus for processing the information illustrated in FIG. 5, the second detecting module 23 is configured to obtain, via a standard interface, an action that the application acquires user information, and to record the action of acquiring the user information by means of code instrumentation technique.

In an embodiment, on the basis of the apparatus for processing the information illustrated in FIG. 5, the display module 24 is configured to display the source and the action information of the application on a predetermined display interface in an order of time.

The apparatus embodiments correspond to the method embodiments described above. For detailed description of operations by the modules, reference may be made to the above description of the method embodiments. The apparatus embodiments described above are only schematic. The modules described as separate components may or may not be physically separated, and the components displayed as modules may be located in a place or distributed to a plurality of networks. Some or all of the modules may be selected based on an actual requirement.

Embodiments of the present disclosure also provide a terminal including a processor and a memory. The memory is configured to store instructions executable by the processor. The processor is configured to: detect whether an application is launched; determine a source for launching the application in response to detecting that the application is launched, and detect action information of the application; and display the source and the action information of the application.

Figure 6:
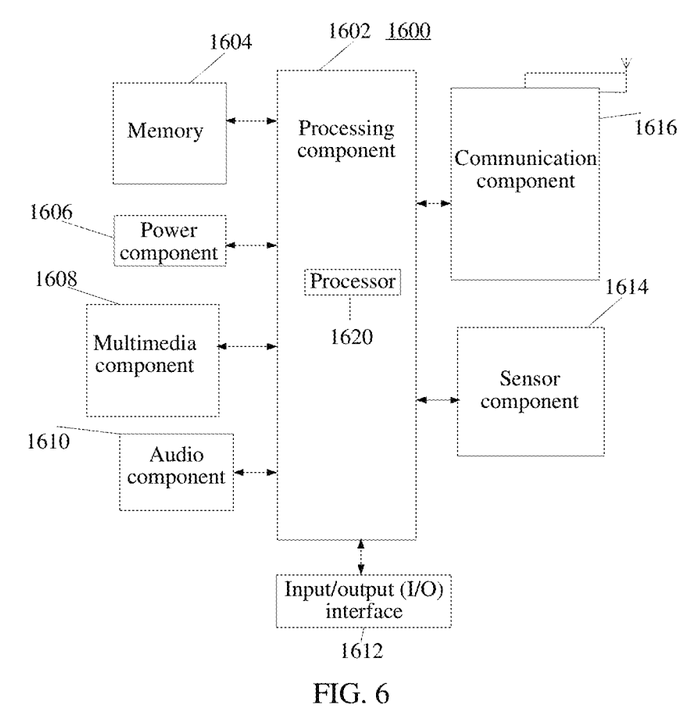
FIG. 6 is a block diagram a device for processing information according to an exemplary embodiment of the present disclosure.

FIG. 6 is a block diagram illustrating a device 1600 for processing information according to an exemplary embodiment of the present disclosure. For example, the device 1600 may be a terminal, such as a mobile phone, a computer, a digital broadcasting terminal, a message sending and receiving equipment, a game controller, a tablet device, a medical device, a fitness equipment, a personal digital assistant or the like. The wearable device may be an intelligent watch, intelligent smart glasses, an intelligent bracelet, intelligent running shoes, etc.

As illustrated in FIG. 6, the device 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 typically controls overall operations of the device 1600, such as the operations associated with display, telephone calls, data communications, camera operations, and recording operations. In addition, the processing component 1602 may include one or more processors 1602 to execute instructions to perform all or part of the steps in the above described methods. Moreover, the processing component 1602 may include one or more modules which facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operation of the device 1600. Examples of such data include instructions for any applications or methods operated on the device 1600 for performing the directional operation, contraction data, phonebook data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1606 is configured to provide power to various components of the device 1600. The power component 1606 may include a power management system, one or more power sources, and any other components associated with the generation, management, and distribution of power in the device 1600.

The multimedia component 1608 includes a screen providing an output interface between the device 1600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and the rear camera may receive an external multimedia datum while the device 1600 is in an operation mode, such as an adjustment mode or a video mode. Each of the front camera and the rear camera may be a fixed optical lens system or have focus and optical zoom capability.

The audio component 1610 is configured to output and/or input audio signals. For example, the audio component 1610 includes a microphone ("MIC") configured to receive an external audio signal when the device 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 is configured to provide an interface between the processing component 1602 and peripheral interface modules, such as a keyboard, a click wheel, buttons, and the like. The buttons may include, but be not limited to, a home button, a volume button, a starting button, and a locking button.

The sensor component 1614 includes one or more sensors to provide status assessments of various aspects of the device 1600. For example, the sensor component 1614 may detect an open/closed status of the device 1600, relative positioning of components, e.g., the display and the keypad of the device 1600, a change in position of the device 1600 or a component of the device 1600, a presence or absence of user contraction with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may also include a light sensor, such as a CMOS (complementary metal-oxide-semiconductor)) or CCD (charge coupled device) image sensor, for use in imaging applications. In some embodiments, the sensor component 1614 may also include an accelerometer sensor, a gyroscope sensor, a magnetic sensor, a pressure sensor, or a temperature sensor.

The communication component 1616 is configured to facilitate communication, wired or wirelessly, between the device 160 and other devices. The device 1600 may access a wireless network based on a communication standard, such as Wi-Fi, 4G, or 5G, or a combination thereof. In one exemplary embodiment, the communication component 1616 receives a broadcast signal or broadcast associated information from an external broadcast management system via a broadcast channel. In an exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In exemplary embodiments, there is also provided a non-transitory computer readable storage medium including instructions, such as included in the memory 1604, executed by the processor 1620 in the device 1600 for performing the method for processing information. The method includes: detecting whether an application is launched; determining a source for launching the application and detecting action information of the application, in response to detecting that the application is launched; and displaying the source and the action information of the application.

The non-transitory computer readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known and customary practice in the art. It is intended that the specification and examples be considered as exemplary only, with a true scope and spirit of the present disclosure being indicated by the following claims.

It should be understood that the present disclosure is not limited to the exaction construction that has been described above and illustrated in the accompanying drawings, and that various modifications and changes may be made without departing from the scope thereof. It is intended that the scope of the present disclosure only be limited by the appended claims.

What is claimed is:

1. A method for processing information, comprising:
   detecting, by a terminal, whether a component of an application of the terminal is launched;
   in response to detecting that the component of the application is launched;
      performing, by the terminal, a code instrumentation at a launching interface of a launched component of the application of the terminal to record an entity for initiating to launch the application, or performing, by the terminal, the code instrumentation to record an action that the application is activated by a system mechanism, to determine a source for launching the application;
   detecting action information of the application;
   displaying, by the terminal, the source and the action information of the application;
   receiving an input command generated based on the action information of the application to manage the application; and
   managing the application by at least one of:
      setting an access permission to the application;
      stopping running the application; or
      uninstalling the application,
   wherein detecting the action information of the application comprises:
      obtaining, via a standard interface, an action that the application acquires user information, and recording the action that the application acquires the user information by means of code instrumentation technique.

2. The method of claim 1, wherein the source comprises a chain-start source, a user-start source, or an auto-start source.

3. The method of claim 1, wherein displaying the source and the action information of the application comprises:
   displaying the source and the action information of the application on a predetermined display interface in an order of time.

4. The method of claim 1, wherein the action information comprises at least one of a called object, an occurrence time of an action, an occurrence number of the action, an execution result of the action, and an operation state of the application when the action occurs.

5. A terminal, comprising:
   a processor; and
   a memory configured to store executable instructions by the processor;
   wherein the processor is configured to:
   detect whether a component of an application of the terminal is launched;
   in response to detecting that the component of the application is launched;
      perform a code instrumentation at a launching interface of a launched component of the application of the terminal to record an entity for initiating to launch the application, or perform the code instrumentation to record an action that the application is activated by a system mechanism, to determine a source for launching the application and detect action information of the application;

display the source and the action information of the application;

receive an input command generated based on the action information of the application to manage the application; and manage the application by at least one of:
    setting an access permission to the application;
    stopping running the application; or
    uninstalling the application, wherein detecting the action information of the application comprises:
    obtaining, via a standard interface, an action that the application acquires user information, and recording the action that the application acquires the user information by means of code instrumentation technique.

6. The terminal of claim 5, wherein the source comprises a chain-start source, a user-start source or an auto-start source.

7. The terminal of claim 5, wherein in displaying the source and the action information of the application, the processor is further configured to:
    display the source and the action information of the application on a predetermined display interface in an order of time.

8. The terminal of claim 5, wherein the action information comprises at least one of a called object, an occurrence time of an action, an occurrence number of the action, an execution result of the action, and an operation state of the application when the action occurs.

9. A non-transitory computer readable storage medium having stored thereon instructions that, when executed by a processor of a terminal, cause the terminal to perform a method for processing information, the method comprising:
    detecting whether a component of an application of the terminal is launched;
    in response to detecting that the component of the application is launched;
        performing, by the terminal, a code instrumentation at a launching interface of a launched component of the application of the terminal to record an entity for initiating to launch the application or performing, by the terminal, the code instrumentation to record an action that the application is activated by a system mechanism, to determine a source for launching the application and detecting action information of the application;
    displaying the source and the action information of the application;
    receiving an input command generated based on the action information of the application to manage the application; and
    managing the application by at least one of:
        setting an access permission to the application;
        stopping running the application; or
        uninstalling the application,
    wherein detecting the action information of the application comprises:
        obtaining, via a standard interface, an action that the application acquires user information, and recording the action that the application acquires the user information by means of code instrumentation technique.

10. The non-transitory computer readable storage medium of claim 9, wherein the source comprises a chain-start source, a user-start source, or an auto-start source.

* * * * *